United States Patent
Chang et al.

(10) Patent No.: US 9,627,689 B2
(45) Date of Patent: Apr. 18, 2017

(54) CATHODE ACTIVE MATERIAL AND LITHIUM SECONDARY BATTERY CONTAINING THE SAME

(75) Inventors: Sung kyun Chang, Daejeon (KR); Hong-Kyu Park, Daejeon (KR); Sinyoung Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 12/847,138

(22) Filed: Jul. 30, 2010

(65) Prior Publication Data

US 2011/0165463 A1    Jul. 7, 2011

Related U.S. Application Data

(63) Continuation of application No. PCT/KR2010/000083, filed on Jan. 6, 2010.

(30) Foreign Application Priority Data

Jan. 6, 2009   (KR) .................... 10-2009-0000699

(51) Int. Cl.
| | |
|---|---|
| *H01M 4/131* | (2010.01) |
| *H01M 4/62* | (2006.01) |
| *H01M 4/36* | (2006.01) |
| *H01M 4/525* | (2010.01) |
| *H01M 10/0525* | (2010.01) |
| *H01M 4/02* | (2006.01) |

(52) U.S. Cl.
CPC .......... *H01M 4/625* (2013.01); *H01M 4/366* (2013.01); *H01M 4/525* (2013.01); *H01M 4/62* (2013.01); *H01M 10/0525* (2013.01); *H01M 2004/028* (2013.01)

(58) Field of Classification Search
CPC .................................................... H01M 4/366
See application file for complete search history.

(56) References Cited

U.S. PATENT DOCUMENTS

2002/0086210 A1*  7/2002  Naruoka et al. ............... 429/223
2005/0227147 A1*  10/2005  Kogetsu et al. ......... 429/231.95
(Continued)

FOREIGN PATENT DOCUMENTS

| JP | 11-16566 A | 1/1999 |
|---|---|---|
| KR | 10-2001-0091887 A | 10/2001 |
| KR | 10-2007-0018293 A | 2/2007 |

(Continued)

OTHER PUBLICATIONS

Office Action issued in Chinese Application No. 201080003771.6, issued on Aug. 3, 2015.

*Primary Examiner* — Barbara Gilliam
*Assistant Examiner* — Stephan Essex
(74) *Attorney, Agent, or Firm* — Birch, Stewart, Kolasch & Birch, LLP

(57) ABSTRACT

Disclosed herein is a cathode active material based on lithium nickel oxide represented by Formula 1, wherein the lithium nickel oxide has a nickel content of at least 40% among overall transition metals and is coated with a compound not reacting with an electrolyte ("non-reactive material"), which is selected from a group consisting of oxides, nitrides, sulfides and a mixture or combination thereof not reacting with an electrolyte, as well as a carbon material, at a surface of the lithium nickel oxide.

13 Claims, 4 Drawing Sheets

(56) References Cited

U.S. PATENT DOCUMENTS

2006/0093920 A1* 5/2006 Cheon et al. ................ 429/232
2008/0063941 A1  3/2008 Itaya et al.

FOREIGN PATENT DOCUMENTS

| KR | 10-2007-0066453 A | 6/2007 |
| KR | 10-2007-0081831 A | 8/2007 |
| KR | 2007081831 A * | 8/2007 |
| KR | 10-0824931 B1 | 4/2008 |

* cited by examiner

CATHODE ACTIVE MATERIAL AND LITHIUM SECONDARY BATTERY CONTAINING THE SAME

CROSS REFERENCE TO RELATED APPLICATIONS

This application is a Continuation of PCT International Application No. PCT/KR2010/000083 filed on Jan. 6, 2010, which claims the benefit of Patent Application No. 10-2009-0000699 filed in Republic of Korea, on Jan. 6, 2009. The entire contents of all of the above applications is hereby incorporated by reference into the present application.

TECHNICAL FIELD

The present invention relates to a cathode active material and a lithium secondary battery containing the same and, more particularly, to a cathode active material based on lithium nickel oxide represented by Formula 1, wherein the lithium nickel oxide has a nickel content of at least 40% among overall transition metals and is coated with a compound not reacting with an electrolyte ("a non-reactive material"), which is selected from a group consisting of non-reactive oxides, nitrides, sulfides and a mixture or combination thereof, as well as a carbon material at a surface thereof.

BACKGROUND ART

With technological advancement and demand for mobile instruments, demand for secondary batteries as an energy source is rapidly increasing.

In particular, as interest in environmental problems is increased, a great deal of research on electric vehicles and hybrid electric vehicles has been conducted in order to replace conventional automobiles using fossil fuels such as a gas-oil vehicle, a diesel vehicle, etc., which are a major cause of air pollution. Such an electric vehicle or hybrid electric vehicle is generally driven using a nickel-metal hydride battery type power source, however, a lithium secondary battery with high energy density and discharge voltage is now actively being studied and partially commercialized in the related art.

Although an anode active material for a lithium secondary battery generally includes a carbon material, lithium metals or sulfur compounds may also be used. As to cathode active materials for a lithium secondary battery, lithium containing cobalt oxide ($LiCoO_2$) is widely used. Additionally, other lithium transition metal oxides, for example, lithium containing manganese oxides such as $LiMnO_2$ with a lamellar crystal structure, $LiMn_2O_4$ with a spinel crystal structure, etc., lithium containing nickel oxide ($LiNiO_2$), and the like have also been proposed.

However, the lithium transition metal oxide used for a cathode active material has drawbacks such as low electrical conductivity, low ionic conductivity due to use of a non-aqueous electrolyte, in turn not satisfying high charge-discharge rate properties, and so forth.

In order to solve such problems, some conventional techniques such as coating of a surface of a cathode active material or surface treatment of the same have been proposed. For example, a coating method of a cathode active material with conductive polymer which includes applying a conductive material to the cathode active material, in order to decrease contact resistance at an interface between the cathode active material and an electrolyte or side product generated at a high temperature, has been disclosed. However, improved cathode active materials with sufficient cell characteristics still need to be developed.

Furthermore, high energy density means possible exposure to risks and risks such as ignition, explosion, etc. may become more serious as the energy density is increased.

Accordingly, in spite of extensive research and studies into different approaches, satisfactory results have not yet been attained. Because of increase in energy density in proportion with increasing complexity and multi-functionality of mobile instruments, safety of the same is more significant and rate properties of a lithium secondary battery for EVs, HEVs, power tools, etc. should be further improved.

However, since safety and rate properties have substantially contradictory tendencies, it is very difficult to simultaneously enhance both the foregoing characteristics and very little research and/or discussions regarding the same are currently being conducted.

DISCLOSURE

Technical Problem

Therefore, the present invention is directed to solving conventional problems described above and to overcoming technical restrictions in related arts.

As a result of extensive studies and a number of experiments executed by the present inventors, it was found that a cathode active material prepared by applying a non-reactive material as well as a carbon material to a surface of a lithium nickel oxide may exhibit improved electrical conductivity and ionic conductivity while enhancing high temperature stability, so as to have excellent rate properties. Thereby, the present invention was successfully completed.

Technical Solution

Accordingly, the present invention provides a cathode active material including a lithium nickel oxide represented by Formula 1, wherein the lithium nickel oxide has a nickel content of at least 40% among overall transition metals and is coated with a compound not reacting with an electrolyte ("non-reactive material"), which is selected from a group consisting of oxides, nitrides, sulfides and a mixture or combination thereof not reacting with an electrolyte, as well as a carbon material, at a surface of the lithium nickel oxide.

$$Li_xNi_yM_{1-y}O_2 \qquad (1)$$

wherein $0.95 \leq x \leq 1.15$, $0.4 \leq y \leq 0.9$, and M is at least one selected from a group consisting of stable elements at six-coordination such as Mn, Co, Mg, Al, etc.

The lithium nickel oxide according to the present invention is coated with a non-reactive material selected from a group consisting of oxides, nitrides, sulfides and a mixture or combination thereof which are not reactive to an electrolyte, as well as a carbon material, on a surface of the oxide, thereby maintaining high temperature stability while exhibiting excellent rate properties based on high electrical conductivity and ionic conductivity.

More particularly, applying a non-reactive material to the lithium nickel oxide may form an interface between an electrolyte and a cathode active material. Thanks to such an interface, exposure of the cathode active material to an electrolyte at an abnormally high temperature or owing to internal and/or external impact is inhibited, in turn preventing excessive discharge of oxygen and rapid exothermic reaction. As a result, ignition and/or explosion of a battery may be prevented, thus improving high temperature stability. In addition, such a carbon material may increase electrical conductivity and ionic conductivity, in turn enhancing rate properties.

The present inventors also found that applying both the non-reactive material and the carbon material to a surface of lithium nickel based oxide provides synergistic effects based on interaction of the foregoing materials and, therefore, cell performance and high temperature stability may be remarkably enhanced, compared to addition of either the non-reactive material or the carbon material alone.

The inventive lithium nickel oxide is a cathode active material with high Ni content of not less than 40% among other transition metals. As such, if the active material has higher Ni content than other transition metals, a fractional ratio of divalent nickel is relatively high. In this case, since an amount of charge to transport lithium ions is increased, high charge capacity is provided.

Constitutional composition of the foregoing lithium nickel oxide must satisfy a specific condition defined by Formula 1:

$$Li_xNi_yM_{1-y}O_2 \quad (1)$$

wherein $0.95 \leq x \leq 1.15$, $0.4 \leq y \leq 0.9$, and M is at least one selected from a group consisting of stable elements at six-coordination such as Mn, Co, Mg, Al, etc.

That is, lithium (Li) content 'x' ranges from 0.95 to 1.15 and, if Li content exceeds 1.5, safety may be decreased during cycling due to high voltage (U=4.35V) at a particular temperature of 60° C. In contrast, if x<0.95, rate properties and reverse capacity are reduced.

Alternatively, Ni content 'y' ranges from 0.4 to 0.9, which is relatively higher than those of manganese and cobalt. If Ni content is less than 0.4, the cathode active material cannot have high capacity. On the contrary, when the nickel content is above 0.9, safety is drastically decreased.

M refers to at least one selected from stable elements at six-coordination such as Mn, Co, Mg, Al, etc. Preferably, M is Mn or Co.

A preferred example of the lithium nickel oxide represented by Formula 1 may be one represented by Formula 1a below:

$$Li_xNi_yMn_cCo_dO_2 \quad (1a)$$

wherein c+d=1−y, provided $0.05 \leq c \leq 0.4$ and $0.1 \leq d \leq 0.4$.

When Mn content 'c' is less than 0.05, safety is deteriorated. With c>0.4, an amount of charge to transport ions is reduced, thus decreasing the charge capacity.

In addition, Co content 'd' ranges from 0.1 to 0.4. If d>0.4, that is, the cobalt content is excessively high, raw material costs are generally increased while $Co^{4+}$ is unstable during battery charging, thus decreasing safety of the battery. On the other hand, if d<0, that is, the cobalt content is too low, it is difficult to simultaneously achieve desirable rate properties and high power density of a battery.

With regard to lithium nickel oxide having high Ni content, as a content of $Ni^{2+}$ ions is increased during calcination, desorption of oxygen becomes serious at a high temperature. As a result, several problems, namely, decrease in stability of a crystal structure, widening of specific surface area, increased impurity content, in turn increasing reactivity of the foregoing oxide with an electrolyte, reduced high temperature stability, and the like have been encountered.

Accordingly, the present invention adopts application of a non-reactive material to a surface of a cathode active material represented by Formula 1 in order to minimize reactivity of the surface of the cathode active material with an electrolyte, thereby favorably improving high temperature stability.

As to application of a non-conductive material to a surface of the cathode active material to improve high temperature stability, a small coating amount does not substantially influence safety. In contrast, over-application thereof may considerably influence an ion path, thus deteriorating electrochemical performance. Also, because of electrically non-conductive materials, an electric path may be cut off, in turn deteriorating performance of a battery.

On the contrary, according to the present invention, the surface of the cathode active material is further coated with a carbon material having excellent conductivity after applying the non-reactive material, so as to improve mobility of ions and electrons, thus supporting conductivity.

Increase in particle size of the lithium nickel oxide may improve stability of crystal particles, enabling easy manufacture of a battery containing the same and improving efficiency of a manufacturing process. However, the particle is too large, a surface area on which the active material reacts with an electrolyte in a battery cell is reduced, causing serious deterioration in characteristics such as high voltage storage, rate properties, etc. On the contrary, if a particle size of the lithium nickel oxide is excessively decreased, structural stability such as high temperature characteristics is deteriorated. Considering these problems, the lithium nickel oxide may have an average particle diameter (D50) of 3 to 20 μm. Briefly, such structural stability including high temperature characteristics may be relatively favorable while reducing adverse effects such as degradation of electrolyte.

Preferably, the lithium nickel oxide may comprise secondary particles formed by agglomeration of primary particles. The primary particles have an average particle diameter of 0.01 to 8 μm while an average particle diameter of the secondary particles preferably ranges from 3 to 20 μm.

As a size of the primary particles is decreased, excellent rate properties may be embodied. However, if the particle diameter is too small, a specific surface area of the primary particles is considerably large. Thereby, an amount of impurities present on a surface of the lithium nickel oxide is increased and a structure of the secondary particles formed by agglomeration of primary particles may be broken due to pressure applied during manufacture of a cathode. On the other hand, when the particle diameter of the primary particles is large, the amount of impurities is reduced and the structure of the secondary particles may be preferably maintained. However, excessively large particle diameter may encounter deterioration in rate properties.

Meanwhile, as a size of the secondary particles is decreased, mobility of lithium ions may be improved in turn embodying excellent rate properties. However, if the particle size is too small during manufacture of a cathode, some problems including, for example, decrease in dispersibility caused by agglomeration of particles, increase in amount of binder, reduction of cell capacity, and the like have been encountered.

The foregoing non-reactive material means a substance not having reactivity to an electrolyte and may include any one compound selected from a group consisting of, for example, oxides, nitrides, sulfides and a mixture or composite of two or more thereof.

More particularly, the non-reactive material may be selected from: oxides such as aluminum oxide, magnesium oxide, zirconium oxide, etc.; fluorides such as aluminum fluoride, magnesium fluoride, etc.; and phosphates such as aluminum phosphate, and so forth, which are well known to provide surface stability. However, if any one of the foregoing substances is present on a surface of the cathode active material, electrochemical performance may be deteriorated.

The non-reactive material may form an interface between the cathode active material and the electrolyte. Thanks to such an interface, exposure of the cathode active material to an electrolyte at an abnormally high temperature or owing to internal and/or external impact is inhibited, in turn preventing excessive discharge of oxygen and rapid exothermic reaction. As a result, ignition and/or explosion of a battery may be prevented, thus improving high temperature stability.

However, when only the non-reactive material not reacting with the electrolyte is applied to a surface of the cathode active material in order to enhance high temperature stability, resistance of an electrode is increased and electrode performance is deteriorated.

Accordingly, the present invention adopts application of a carbon material as well as the above non-reactive material to the cathode active material, in order to enhance high temperature stability of a battery and rate properties thereof.

The carbon material applied to a surface of the cathode active material may improve electrical conductivity and ionic conductivity, thus enhancing rate properties thereof.

The carbon material may include, for example: graphite such as natural graphite or artificial graphite; carbon black such as carbon black, acetylene black, ketchen black, channel black, furnace black, lamp black, summer black, etc., and the like, which are used alone or as a combination of two or more thereof.

The non-reactive material or the carbon material preferably has an average particle diameter D50 equal to 50% or less of an average particle diameter D50 of lithium nickel oxide.

More particularly, since the non-reactive material and the carbon material are applied to a surface of the lithium nickel oxide, dispersibility may be decreased due to particle aggregation if each particle diameter of both materials is too small, in turn causing difficulties in uniform application thereof. On the contrary, when each average particle diameter D50 of the foregoing materials is more than 50% of the average particle diameter D50 of lithium nickel oxide, it is difficult to conduct interface-coating of the surface of the lithium nickel oxide with these materials. More preferably, each of the foregoing materials may have an average particle diameter equal to 10 to 50% of average particle diameter of lithium nickel oxide.

Preferably, the average diameter of the non-reactive material or the carbon material may be 50% or less of the average diameter D50 of lithium nickel oxide.

If a content of the non-reactive material is too large, internal resistance is increased and electrical conductivity and ionic conductivity are substantially not improved by application of a carbon material. In contrast, when the content is too small, sufficiently high temperature stability may not be attained. Also, as a content of the carbon material is increased, conductivity may be enhanced. In this case, however, a coating area of the non-reactive material is reduced and very little improvement in high temperature stability may be attained. Accordingly, a relative content ratio of the non-reactive material to the carbon material may range from 90:10 to 10:90 (wt. %).

The non-reactive material and the carbon material may be applied to a surface of the lithium nickel oxide by chemical bonding and, in consideration of simple processing and stability of lithium nickel oxide, may be preferably combined with the same by physical bonding.

Physical bonding is not a chemical bonding such as ionic bonding or covalent bonding but refers to a contact condition by reverse bonding without modification of chemical properties, such as van-der-Waals force or electrostatic force, etc.

Such physical bonding may be accomplished by a simple method using, for example, a mechanofusion device or Nobilta equipment for fusion. The mechanofusion device utilizes physical rotation in a dried state to prepare a mixture, so as to form static coupling of constitutional components.

The non-reactive material and the carbon material may each be independent phases applied to a surface of the lithium nickel oxide or, otherwise, may form a combination thereof and be applied to the surface of the lithium nickel oxide.

It is not necessary to completely coat lithium nickel oxide with the non-reactive material as well as the carbon material, for the purpose of accomplishing functional effects of the present invention.

If a coating area of both the non-reactive material and the carbon material is excessively large, mobility of lithium ions is reduced and rate properties may be deteriorated. When the coating area is too small, desired effects may not be attained. Therefore, it is preferable to coat about 20 to 80% of the overall surface of the lithium nickel oxide with the foregoing non-reactive material and the carbon material.

If a coating amount of these materials is too small, minimal coating effects may be attained. On the contrary, when the coating amount is too large, cell performance may be deteriorated. Therefore, the coating amount may range from 0.5 to 10% by weight relative to a total weight of the active material.

The present invention also provides a lithium secondary battery containing the cathode active material described above. The lithium secondary battery may comprise, for example, a cathode, an anode, a separator and a non-aqueous electrolyte containing lithium salt.

The cathode is fabricated by, for example, applying a mixture of the cathode active material, a conductive material and a binder to a cathode collector and drying the coated collector. Optionally, a filler may be added to the mixture. The anode is fabricated by applying an anode active material to an anode collector and drying the coated collector and, if necessary, may further contain the foregoing ingredients.

The anode active material may include, for example: carbon and graphite materials such as natural graphite, artificial graphite, expandable graphite, carbon fiber, hard carbon, carbon black, carbon nanotubes, fullerene, activated carbon, etc.; metals alloyable with lithium such as Al, Si, Sn, Ag, Bi, Mg, Zn, In, Ge, Pb, Pd, Pt, Ti, etc. and compounds containing the same; composites of metals and compounds thereof with carbon and graphite materials; lithium containing nitrides, and so forth. Among these, carbon based active materials, silicon based active materials, tin based active materials, and/or silicon-carbon based active materials are more preferable and may be used alone or in combination of two or more thereof.

The separator is interposed between the cathode and the anode and consists of a thin insulation film having high ion permeability and excellent mechanical strength. A diameter of each pore in the separator generally ranges from 0.01 to 10 μm and a thickness thereof generally ranges from 5 to 300 μm. Such separator may be fabricated using a sheet or non-woven fabric made of, for example, an olefin polymer such as polypropylene having chemical resistance and hydrophobicity, glass fiber or polyethylene. When a solid electrolyte such as a polymer electrolyte is used, this electrolyte may also serve as the separator.

Another example of the separator may be an organic/inorganic composite porous separator having an active film, characterized in that at least one region selected from a polyolefin based separator substrate, a surface of the substrate and a part of a porous region in the active film is coated with a mixture of inorganic particles and a binder polymer. Optionally, the inorganic particles may be applied to an electrode side.

Such inorganic particle may include, for example, an inorganic particle with a dielectric constant of 5 or more, an inorganic particle exhibiting piezo-electricity, an inorganic particle with lithium ion transfer ability, and the like.

The binder may include, for example: polyvinylidene fluoride; polyvinyl alcohol; carboxymethyl cellulose (CMC); starch; hydroxypropyl cellulose; regenerated cellulose; polyvinyl pyrrolidone; tetrafluoroethylene; polyethylene; polypropylene; ethylene-propylene-diene terpolymer (EPDM); sulfonated EPDM; styrene-butylene rubber; fluorine rubber; different copolymers; high saponification polyvinyl alcohol, and the like.

The conductive material is used to improve conductivity of the electrode active material and may be added in an amount of 1 to 30 wt. % relative to a total weight of an electrode mixture. The conductive material is not particularly restricted so long as it exhibits conductivity while not causing chemical change of a battery. For example, the conductive material may comprise: graphite such as natural graphite or artificial graphite; carbon black such as carbon black, acetylene black, ketchen black, channel black, furnace black, lamp black, summer black, etc.; a conductive fiber such as carbon derivatives including carbon nanotubes or fullerenes, carbon fiber, metal fiber, etc.; metal powder such as carbon fluoride, aluminum or nickel powder; a conductive whisker such as zinc oxide, potassium titanate, etc.; conductive metal oxide such as titanium oxide; a conductive material such as polyphenylene derivative, and the like.

A viscosity controlling agent refers to a component regulating viscosity of an electrode mixture in order to help processes for blending and applying the electrode mixture to a collector to be more easily performed. The viscosity controlling agent is preferably added in an amount of up to 30 wt. % relative to a total weight of the electrode mixture. Examples of such viscosity controlling agent may include carboxymethyl cellulose, polyvinylene fluoride, etc., although not duly limited thereto. Optionally, the foregoing solvents may also serve as a viscosity controlling agent.

The filler used herein is an additional component to inhibit expansion of an electrode and is not particularly limited so long as it comprises fibrous materials without causing chemical change of a battery. For example, the filler may be formed using olefin based polymer such as polyethylene, polypropylene, etc. or a fibrous material such as glass fiber, carbon fiber, etc.

A coupling agent is another additional component to increase adhesion between an electrode active material and a binder, characterized in having at least two functional groups, and may be used in an amount of up to 30 wt. % relative to a weight of the binder. An example of such coupling agent may be a material having at least two functional groups wherein one of the functional groups reacts with a hydroxyl or carboxyl group present on a surface of silicon, tin or graphite based active material to form a chemical bond while another functional group reacts with a polymer binder to form another chemical bond. A preferred example of the coupling agents may be a silane based coupling agent including: triethoxysilylpropyl tetrasulfide; mercaptopropyl triethoxysilane; aminopropyl triethoxysilane; chloropropyl triethoxysilane; vinyl triethoxysilane; methacryloxypropyl triethoxysilane; glycidoxypropyl triethoxysilane; isocyanatopropyl triethoxysilane; cyanatopropyl triethoxysilane, etc., although not particularly limited thereto.

An adhesion promoter used herein is an additional component to improve adhesion of an active material to a collector and may be added in an amount of not more than 10 wt. % relative to the binder. Examples of the adhesion promoter may include oxalic acid, adipic acid, formic acid, acrylic acid derivatives, itaconic acid derivatives, and the like.

A molecular weight controller may include, for example, t-dodecylmercaptan, n-dodecylmercaptan, n-octylmercaptan, etc. A cross-linking agent may include, for example, 1,3-butanediol diacrylate, 1,3-butanediol dimethacrylate, 1,4-butanediol diacrylate, 1,4-butanediol dimethacrylate, aryl acrylate, aryl methacrylate, trimethylolpropane triacrylate, tetraethyleneglycol diacrylate, tetraethyleneglycol dimethacrylate, divinylbenzene, and the like.

The collector of the electrode is a part in which electrons move during electrochemical reaction of the active material and, based on types of the electrode, may be classified into an anode collector and a cathode collector.

The anode collector is generally fabricated with a thickness of 3 to 500 µm. So long as the anode collector exhibits conductivity and does not cause chemical change of a battery, materials of the anode collector are not particularly restricted and may include, for example, copper, stainless steel, aluminum, nickel, titanium, calcined carbon, copper or stainless steel surface-treated with carbon, nickel, titanium, silver, etc., or aluminum-cadmium alloy, and so forth.

The cathode collector is generally fabricated with a thickness of 3 to 500 µm. So long as the cathode collector exhibits high conductivity and does not cause chemical change of a battery, materials of the cathode collector are not particularly restricted and may include, for example, stainless steel, aluminum, nickel, titanium, calcined carbon, or aluminum or stainless steel surface-treated with carbon, nickel, titanium, silver, etc.

The collector may form fine unevenness on a surface thereof in order to reinforce binding of an electrode active material and be utilized in different forms such as a film, a sheet, a foil, a net, a porous body, a foam, a non-woven fabric, and the like.

The electrolyte includes lithium salt and a non-aqueous solvent and the lithium salt is a material dissolved in the non-aqueous solvent to serve as a source of lithium ions in a battery, enabling operation of a typical lithium secondary battery, and promotes movement of lithium ions between a cathode and an anode. Such lithium salt may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenylborate, imides, etc.

The non-aqueous organic solvent functions as a medium used for transporting electrochemically reactive ions. Such non-aqueous organic solvent may be an aprotic solvent including, for example: N-methyl-2-pyrrolidinone; propylene carbonate; ethylene carbonate; butylenes carbonate; dimethyl carbonate; diethyl carbonate; γ-butyrolactone; 1,2- dimethoxyethane; tetrahydroxyfuran; 2-methyl tetrahydrofuran; dimethylsulfoxide; 1,3-dioxolane; formamide; dimethylformamide; dioxolane; acetonitrile; nitromethane; methyl formate; methyl acetate; phosphoric triester; trimethoxy methane; dioxolane derivatives; sulfolane; methyl sulfolane; 1,3-dimethyl-2-imidazolidinone; propylene carbonate derivatives; tetrahydrofuran derivatives; ether; methyl propionate; ethyl propionate, etc. When a mixture of two or more of the above organic solvents is used, mixing ratios thereof may be suitably regulated in consideration of cell performance, as will be appreciated by persons of ordinary skill in the art.

The organic solvent may also be a dispersion solvent used in preparing a slurry for fabrication of a cathode and, for example: water; alcohols such as methanol, ethanol, propanol, isopropanol, butanol, isobutanol, s-butanol, t-butanol, pentanol, isopentanol, hexanol, etc.; ketones such as acetone, methylethylketone, methylpropylketone, ethylpropylketone, cyclopentanone, cyclohexanone, cycloheptanone, etc.; ethers such as methylethylether, diethylether, dipropylether, diisopropylether, dibutylether, diisobutylether, di-n-amylether, diisoamylether, methylpropylether, methylisopropylether, methylbutylether, ethylpropylether, ethylisobutylether, ethyl-n-amylether, ethylisoamylether, tetrahydrofuran, etc.; lactones such as γ-butyrolactone, δ-butyrolactone, etc.; lactams such as β-lactam; alicyclic compounds such as cyclopentane, cyclohexane, cycloheptane, etc.; aromatic hydrocarbons such as benzene, toluene, o-xylene, m-xylene, p-xylene, ethylbenzene, propylbenzene, isopropylbenzene, butylbenzene, isobutylbenzene, n-amylbenzene, etc.; aliphatic hydrocarbons such as heptane, octane, nonane, decane, etc.; chain or cyclic amides such as N-methylpyrrolidone; esters such as methyl lactate, ethyl lactate, propyl lactate, butyl lactate, methyl benzoate, etc.; and liquid substances to form a solvent of the electrolyte, although duly not limited thereto. The foregoing dispersion solvent may be used as a combination of two to five thereof.

A lithium secondary battery of the present invention may be fabricated according to any conventional method known in related arts. As to the inventive lithium secondary battery, configurations of the cathode, anode and separator are not particularly restricted and, for example, each sheet may be placed in a circular, angular or pouch type case in a winding or stacking form.

The lithium secondary battery according to the present invention may be employed in various devices requiring excellent rate properties and high temperature stability, for example: a power tool driven by an electric motor; an electric automobile such as an electric vehicle (EV), hybrid electric vehicle (HEV), plug-in hybrid electric vehicle (PHEV), etc.; an electric two-wheel vehicle such as an E-bike, E-scooter, etc.; an electric golf cart, and so forth, without particular limitation.

Advantageous Effects

As described above, when a cathode active material of the present invention is introduced to a lithium secondary battery, excellent high temperature stability as well as high capacity of the battery may be sufficiently attained without deterioration of cell performance of the battery.

BRIEF DESCRIPTION OF THE DRAWINGS

The above and other objects, features and other advantages of the present invention will be more clearly understood from the following detailed description taken in conjunction with the accompanying drawings, in which.

BEST MODE

Hereinafter, exemplary embodiments of the present invention will be described in greater detail with reference to the following examples. However, those skilled in the art will appreciate that these embodiments are proposed for illustrative purpose only and do not restrict the scope of the present invention.

Example 1

After placing an active material:carbon:$Al_2O_3$ in a relative ratio by weight of 100:2:2 into a dry coating device, the mixture was treated at 2.5 kW and 3,000 rpm for 5 minutes. The active material was $LiNi_{0.53}Mn_{0.27}CoO_{0.20}O_2$.

Example 2

The same procedure as described in Example 1 was repeated to treat the active material except that a relative weight ratio of $LiNi_{0.53}Mn_{0.27}Co_{0.20}O_2$:carbon:$Al_2O_3$ was 100:1:1.

Example 3

The same procedure as described in Example 1 was repeated to treat the active material except that a relative weight ratio of $LiNi_{0.5}Mn_{0.3}Co_{0.20}O_2$:carbon:$Al_2O_3$ was 100:2:2.

Comparative Example 1

The active material used in Example 1 was prepared without additional processing.

Experimental Example 1

Figure 1:
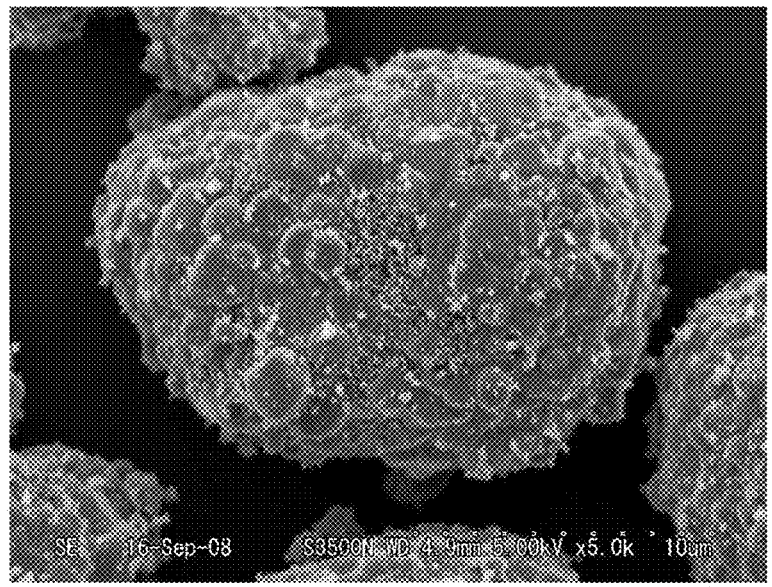
FIG. 1 is an SEM photograph showing a cathode active material prepared in Example 1.
Figure 2:
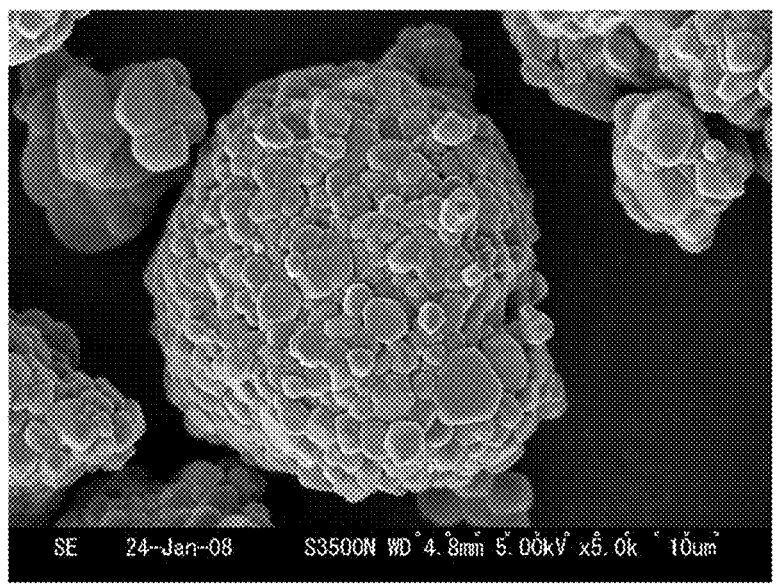
FIG. 2 is an SEM photograph showing a cathode active material prepared in Comparative Example 1.

For each of the active materials obtained in Example 1 and Comparative Example 1, a surface of the active material was observed through SEM. Observed results of the materials of Example 1 and Comparative Example 1 are shown in FIGS. 1 and 2, respectively.

Experimental Example 2

Each of the active materials obtained in Examples 1 to 3 and Comparative Example 1 was formed into a slurry by blending the active material together with a conductive material and a binder in a relative weight ratio of 95:2.5:2.5, followed by applying the slurry to Al-foil so as to form an electrode. After punching the formed electrode to reach 25% porosity, a coin cell was fabricated using the punched electrode. An anode was Li and an electrolyte was 1M LiPF$_6$ dissolved in a carbonate solvent. The fabricated cell was subjected to charge-discharge treatment at 0.1 C and 3 to 4.25V and, after monitoring capacity and cell efficiency, the results obtained for the materials of Examples 1 and 2 and Comparative Example 1 are shown in TABLE 1.

TABLE 1

|  | 1$^{st}$ Charge (mAh/g) | 1$^{st}$ Discharge (mAh/g) | 1$^{st}$ Efficiency (%) |
| --- | --- | --- | --- |
| Comparative Example 1 | 184.3 | 162.1 | 87.9 |
| Example 1 | 185.1 | 162.6 | 87.8 |
| Example 2 | 184.8 | 162.4 | 87.9 |

As shown in TABLE 1, it was found that all of the active materials exhibit favorable electrochemical performance and the active material obtained in Example 3 shows substantially the same results.

Experimental Example 3

Figure 3:
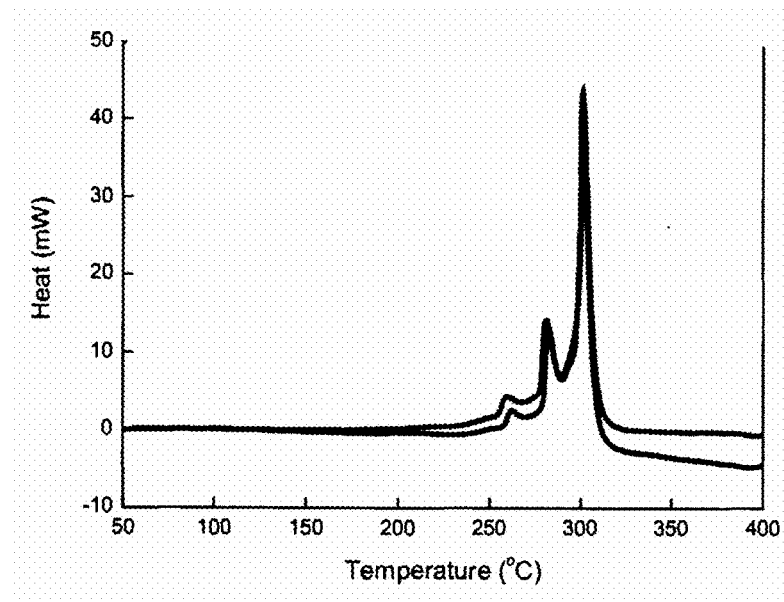
FIG. 3 illustrates a graph for measurement of heating position and heating intensity through DSC after charging a battery formed using the cathode active material prepared in Comparative Example 1 to 4.3V at 0.1 C.
Figure 4:
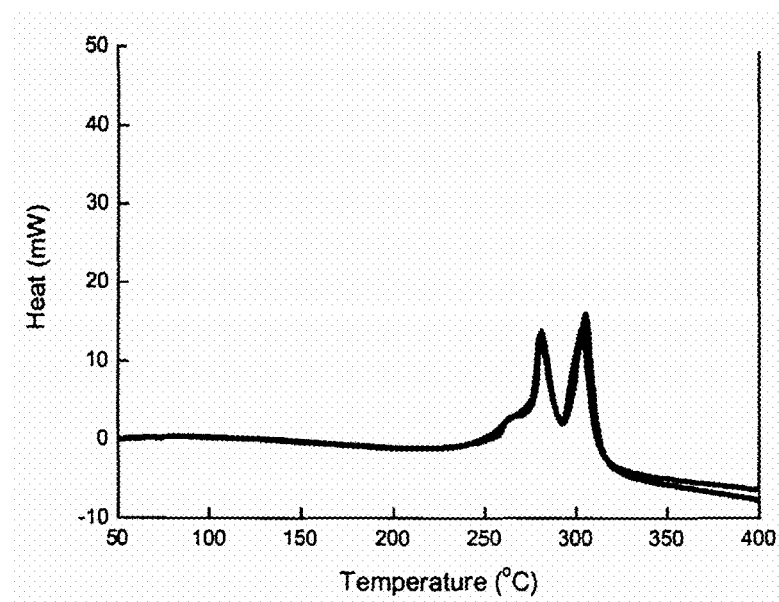
FIG. 4 illustrates a graph for measurement of heating position and heating intensity through DSC after charging a battery formed using the cathode active material prepared in Example 1 to 4.3V at 0.1 C.
Figure 5:
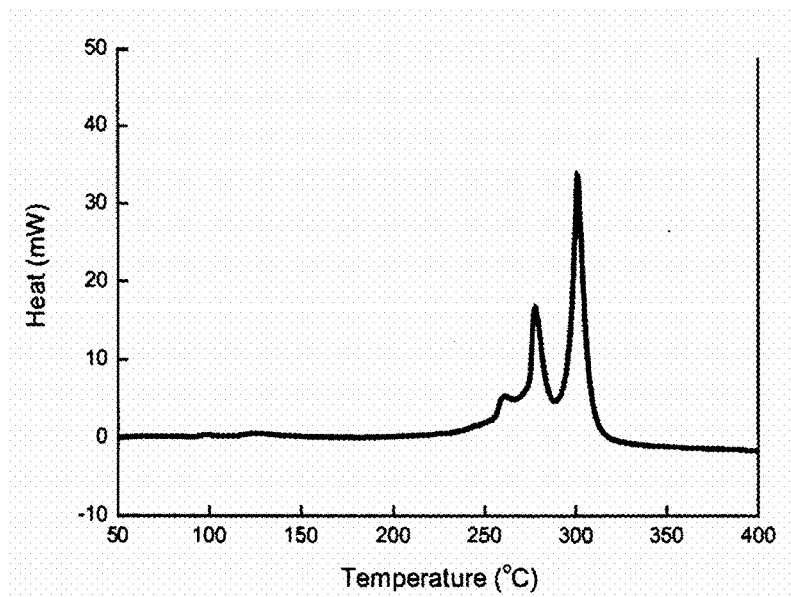
FIG. 5 illustrates a graph for measurement of heating position and heating intensity through DSC after charging a battery formed using a cathode active material prepared in Example 2 to 4.3V at 0.1 C.

After charging a cell fabricated using each of the active materials according to Experimental Example 2 to 4.3V at 0.1 C, heating position and heating intensity were measured using a differential scanning calorimeter (DSC). Results of Comparative Example 1, Example 1 and 2 are shown in FIGS. 3, 4 and 5, respectively.

Compared to Comparative Example 1, it was found that both the active materials obtained in Examples 1 and 2 have drastically reduced heating intensity. Also, it was observed that the heating intensity is further decreased when contents of carbon and Al$_2$O$_3$ in the active material are increased. Example 3 also showed substantially the same results as Example 1. Consequently, we determined that safety of the active material was preferably enhanced.

Experimental Example 4

Figure 6:
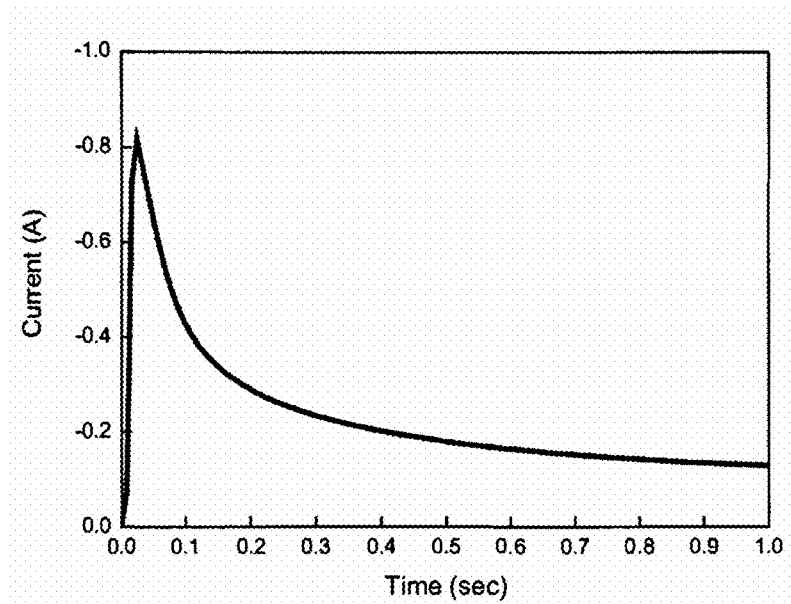
FIG. 6 illustrates a graph of measured SCC results of a battery formed using the cathode active material prepared in Comparative Example 1.
Figure 7:
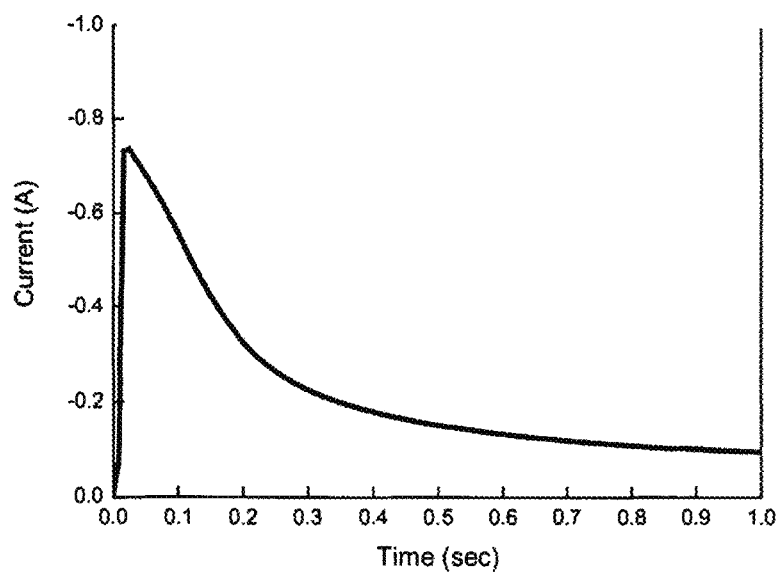
FIG. 7 illustrates a graph of measured SCC results of a battery formed using the cathode active material prepared in Example 1.
Figure 8:
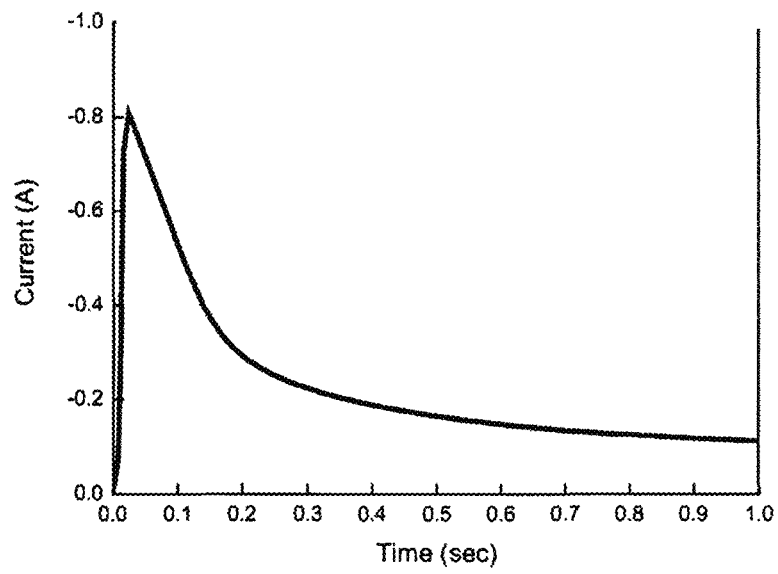
FIG. 8 illustrates a graph of measured SCC results of a battery formed using the cathode active material prepared in Example 2.

For a cell fabricated using each of the active materials according to Experimental Example 2, short circuit current (SCC) was measured. FIGS. 6, 7 and 8 show results of Comparative Example 1, Examples 1 and 2, respectively.

Compared to Comparative Example 1, it was found that both the active materials obtained in Examples 1 and 2 exhibit broadened current peaks. In the present experiment, current peak size seems not to be varied in appearance. However, in fact, it is difficult to decide a current at short circuit (that is, time is close to zero '0') as a peak current, due to measurement limits of metering equipment. If a current profile has a slow slope, that is, when current peak is broadened, the current may be smaller than the foregoing peak current at a time=0. It was observed that such broadening of current peak is more remarkable as contents of carbon and Al$_2$O$_3$ in the active material are increased. Likewise, Example 3 shows substantially the same results as Example 1. Therefore, we determined that safety of the active material was preferably enhanced.

Although the preferred embodiments of the present invention have been disclosed for illustrative purposes, those skilled in the art will appreciate that various applications and modifications are possible on the basis of the above detailed description, without departing from the scope and spirit of the invention as disclosed in the accompanying claims.

The invention claimed is:

1. A cathode active material, comprising:
cathode active material particles, comprising a lithium nickel oxide represented by Formula 1, wherein the lithium nickel oxide has a nickel content of at least 40 molar percent among overall transition metals and wherein the cathode active material particles are coated with a compound not reacting with an electrolyte ("non-reactive material"), which is Al$_2$O$_3$, as well as a carbon material, at a surface of the lithium nickel oxide;

$$Li_xNi_yM_{1-y}O_2 \tag{1}$$

wherein $0.95 \leq x \leq 1.15$, $0.4 \leq y \leq 0.9$, and
M is (1) Mn, (2) Co, and (3) a stable element of Mg or stable elements of Mg and Al; and
wherein a content of the stable element(s) is less than 0.03,
wherein the carbon material is at least one selected from the group consisting of carbon black, acetylene black, and ketchen black,
wherein a nickel content is greater than a manganese content, and the manganese content is greater than a cobalt content, and
wherein a coating amount ranges from 0.5 to 4% by weight relative to a total weight of the cathode active material.

2. The cathode active material according to claim 1, wherein the cathode active material particles have an average particle diameter D50 of 3 to 20 µm.

3. The cathode active material according to claim 1, wherein the cathode active material particles are in a secondary particle form comprising agglomerated primary particles, and the primary particles have an average particle diameter of 0.01 to 8 µm while the secondary particles have an average particle diameter of 3 to 20 µm.

4. The cathode active material according to claim 1, wherein either the non-reactive material or the carbon material has an average particle diameter D50 equal to 50% or less of an average particle diameter D50 of the cathode active material particles.

5. The cathode active material according to claim 1, wherein a relative content ratio of the non-reactive material to the carbon material ranges from 90:10 to 10:90 (wt. %).

6. The cathode active material according to claim 1, wherein the non-reactive material as well as the carbon material are combined with the surface of the cathode active material particles by physical bonding.

7. The cathode active material according to claim 1, wherein the non-reactive material and the carbon material are each independent phases applied to a surface of the cathode active material particles.

8. The cathode active material according to claim 1, wherein the non-reactive material and the carbon material are applied to the surface of the cathode active material particles, in a combination form thereof.

9. The cathode active material according to claim 1, wherein 20 to 80% of an overall surface of the cathode active material particles are coated with the non-reactive material and the carbon material.

10. A lithium secondary battery including the cathode active material as set forth in claim 1.

11. The lithium secondary battery according to claim 10, wherein the lithium secondary battery is used as a power supply for a power tool, an electric vehicle, an electric two-wheel vehicle and/or an electric golf cart.

12. A cathode composition comprising:
the cathode active material according to claim 1;
a conductive material; and
a binder.

13. A cathode, comprising:
a cathode collector; and
the cathode composition according to claim 12 applied to the current collector.

\* \* \* \* \*